Patented Oct. 26, 1954

2,692,834

UNITED STATES PATENT OFFICE 2,692,834

METHOD OF TREATING BENZYL CELLULOSE

Walter E. A. Simon, Watford, England, assignor, by mesne assignments, to Brycel Limited, Brentford, England, a British company No Drawing. Application January 23, 1951, Serial No. 207,426

Claims priority, application Great Britain February 3, 1950

1 Claim. (Cl. 106—186)

This invention relates to a method of treating compositions of matter wholly or partly consisting of benzyl cellulose which evolves benzaldehyde on heating. Other benzylated carbohydrates which may be so treated are those of sugars and starches.

The formation of benzaldehyde has been a severe disadvantage in the use of benzyl cellulose as a "plastic" because of the formation by the benzaldehyde, on cooling, of pores or bubbles, unless vary heavy pressures are used.

According to the present invention, a small proportion of a substance which can react with the aldehyde to form a substance which is not gaseous at the temperatures involved, is mixed with the benzylated cellulosic substance (together with a catalyst where necessary), while the cellulosic substance is heated to bring it into fluid condition. Thus the benzaldehyde is formed into a fluid or solid polymer, resin, plasticizer, a substance inert to the benzylated substance, a metal-organic compound (e. g. silicones) or a dye. The cellulosic substance will be heated to 155 to 175° C.—usually 160 to 170° C.

The required quantity of the said substance may be slightly greater than equimolecular quantity to the aldehyde liable to be produced e. g. the benzyl cellulose may be heated to say 220° to 240° C. for 2 hours, thereby distilling off benzaldehyde and the quantity of the substance known to react therewith can then be calculated. For example 0.88 gram of aniline will react with 1.0 gram benzaldehyde; 0.96 gram acetic acid anhydride will react with 1.0 gram benzaldehyde; and 2.98 grams of sodium bisulphite ($Na_2S_2O_5 7H_2O$) will react with 1 gram of benzaldehyde.

The said substances may be one or more of the following:

Phenols, cresols, urea, thiourea, aniline, aldehydes and ketones, e. g. amines, ammonia, hydrazine and its derivatives, hydroxylamine and its derivatives (compounds having active methyl or methylene groups), acidanhydrides e. g., giving Perkin's reaction, cyanides, sodium methylate, mandelonitrile, substances giving Cannizzaro's reaction, substances for oxidation of benzaldehyde to benzoic acid by means of Grignard compounds forming phenylmethylcarbinol, phosphorchloride ($PCl_3$) phosphorpentasulphide, $H_2S$, magnesium silicide, and alkali metal bisulphites.

The reaction may result in formation with the benzaldehyde of resins, plasticizers, polymer, metal-organic compounds (e. g. silicones) and dyes.

The following examples show the kinds of solid substances which can be formed:

1. An example of forming a synthetic resin from the benzaldehyde:

The benzaldehyde is transformed by addition of aniline into benzalaniline by condensation, forming a resinous body in the benzylcellulose.

2. An example of forming a plasticizer from the benzaldehyde:

The benzaldehyde is transformed into benzylidenediacetate (by using acetic acid and acetic acidanhydride) being a plasticizer for benzalcellulose contained in the benzylcellulose as well as for benzylcellulose.

3. An example of forming an inert body from the benzaldehyde:

The benzaldehyde is brought into a reaction with sodium bisulphite forming the sodium salt of the phenyloxymethylsulphonic acid being an inert body in the benzylcellulose.

4. An example of forming a synthetic resin and a plasticizer at the same time from the benzaldehyde:

Only such an amount of aniline is added that there remains a sufficient quantity of benzaldehyde to be transformed into benzylidenediacetate thus forming a resinous body being plasticized as well as the benzylcellulose.

5. An example of forming a resinous body and an inert compound:

Only such an amount of aniline is added that there remains a sufficient quantity to be transformed into the sodium-salt of the phenylonmethylsulphonic acid this being combined as a synthetic resin and a filler in the benzylcellulose.

6. An example of forming a resinous body, a plasticizer and an inert body at the same time from the benzaldehyde:

Only such an amount of aniline is added that there is still such an amount of benzaldehyde left that first the plasticizer is formed and afterwards the inert body thus being a combination between a resin, a plasticizer and an inert body in the benzylcellulose.

The following reactions are cited by way of example:

1. Urea:

(a) $2C_6H_5CHO + CO(NH_2)_2 =$ $(C_6H_5CHN)_2CO + 2H_2O$

The reaction proceeds with or without a catalyst.

The same type of reaction is obtained with thiourea.

(b) Combination of urea or thiourea with alkyl, aryl or acyl groups—

$$C_6H_5CHO + CO(NH_2)NH_2 \rightarrow C_6H_5CH.N.CO.NH_2$$

2. Ketone:

$$C_6H_5CHO + CH_3.CO.CH_3 = C_6H_5CH:CH.CO.CH_3 + H_2O$$
(Benzylidenacetone)

The reaction proceeds in aqueous-alcoholic solutions of alkali (e. g. KOH in alcohol) or in the presence of water with secondary aliphatic amines (e. g. piperidene) as catalysts.

3. Amines: These produce Schiff type of bases which are only weak bases and are for example resinified by heating:

$$2C_6H_5CHO + NH_2CH_2CH_2NH_2 =$$
Ethylenediamine $$C_6H_5CH:N.CH_2CH_2N:CH.C_6H_5 + 2H_2O$$
Plasticizer 4. Benzoin condensation:

$$2C_6H_5CHO \longrightarrow C_6H_5COCHOHC_6H_5$$
Plasticizer

This reaction only proceeds in the presence of potassium cyanide as a catalyst.

5. Compounds with active methyl or methylene groups:

For example for the following compounds: CH malonicester, malonic acid, quinaldine, 2 methylpyridine—

(a)

$$CH_2(COOC_2H_5)_2 + C_6H_5CHO = C_6H_5CH:C(COOC_2H_5)_2 + H_2O$$
(Malonicester)

Condensation proceeds under the catalytic influence of amines e. g. pyridine.

(b)

$$CH_3COCH_2COCH_3 + C_6H_5COH \rightarrow$$
(Acetylacetone)

$$CH_3COC(CHC_6H_5)COCH_3 + H_2O$$

An amine catalyst is also required.

6. Cyanhydrine formation:

$$C_6H_5CHO + HCN = C_6H_5CH(OH)CN$$
(Mandelacidnitrile)

Reaction proceeds by heating without a catalyst.

7. Grignard synthesis with benzaldehyde:

$$C_6H_5CHO + CH_3MgCl = C_6H_5CH(CH_3)OMgCl$$

The reaction product is as alcoholate very sensitive to moisture but can be used as a catalyst.

8. Condensation with hydrazine and its derivatives:

$$C_6H_5CHO + C_6H_5NHNH_2 = C_6H_5CH:N.NH.C_6H_5 + H_2O$$
(Benzaldehydephenylhydrazone)

9. Condensation with hydroxylamine and its derivatives:

$$C_6H_5CHO + NH_2OH = C_6H_5CH.N.OH$$
(Benzaloxime)

10. Combination with acid anhydrides to 1,1 diolesters:

$$C_6H_5CHO + (CH_3CO)_2O = C_6H_5CH(OCOCH_3)_2$$
(Benzylidenediacetate)

11. Combination with sulfamide and substituted derivatives:

$$C_6H_5COH + SO_2(NH_2) =$$

$$C_6H_5CH:N.SO_2.N:CH.C_6H_5$$

The reaction proceeds without a catalyst when heated. The product is suitable for resinification.

12. Combination with Mg₂Si:

$$2C_6H_5CHO + Mg_2Si = C_6H_5CH:Si:CHC_6H_5 + 2MgO$$

$$C_6H_5CH:Si:CHC_6H_5 \ldots \text{(Polymerization)}$$

$$\begin{array}{c}
C_6H_5CH-Si-CH-C_6H_5 \\
| \quad | \\
C_6H_5CH-Si-CH-C_6H_5 \\
| \quad | \\
C_6H_5CH-Si-CH-C_6H_5 \\
| \quad | \\
C_6H_5CH-Si-CH-C_6H_5
\end{array}$$

13. Reactions of the benzylalcohols:

(a) With isocyanates—

$$C_6H_5CH_2OH + C_6H_5NCO = C_6H_5CH_2O.CO.NHC_6H_5$$
Phenylcarbamineacidbenzylester (Plasticizer)

(b) Esterification with acid anhydrides and higher and unsaturated acids—

$$C_6H_5CH_2OH + (C_4H_9CO)_2O = C_6H_5CH_2O.CO.C_4H_9 + C_4H_9COOH$$
(Butyricanhydride)

(c) Direct esterification with acids—

$$C_6H_5CH_2OH + C_{17}H_{31}COOH \longrightarrow C_6H_5CH_2OCOC_{17}H_{31}$$
Linoleic acid    Linoleicacidbenzylester 14. Combination of benzaldehyde with higher unsaturated fatty acids:

These combinations can occur if a methyl group becomes active in the acid in a position between double bond and carboxyl.

Benzylcellulose treated in accordance with the invention may be used for many purposes, e. g. coatings, textile fibres, windscreens, insulators, varnishes, and gramophone records. The physical condition of the material may vary between a hard solid body to a body having the elasticity of leather.

15. Aldehyde (in the presence of a catalyst):

$$C_6H_5CHO + CH_3CHO \longrightarrow C_6H_5.CH:CH.CHO$$
Benzaldehyde  Acetaldehyde   Cinnamic aldehyde Whilst benzylcellulose is referred to in the above description and examples, the same condensation substances will be suitable if other cellulose ethers are involved.

I claim:

A method of treating benzyl cellulose to avoid the formation of bubbles and pores in a plastic composition formed therewith comprising heating benzyl cellulose to a temperature of at least 155° C. to bring the composition to a flowable condition, mixing with the benzyl cellulose while so heated a compound which reacts with benzaldehyde to form a compound to thereby prevent the volatilization of benzaldehyde at said temperature, said compound being selected from the group consisting of urea, thiourea, aniline, hydrazine and hydroxylamine, the quantity of said compounds being approximately that calculated to react with the benzaldehyde recoverable from the benzyl cellulose on heating it to 220–240° C. for two hours.

References Cited in the file of this patent

UNITED STATES PATENTS

| Number | Name | Date |
|---|---|---|
| 1,460,097 | Donahue | June 26, 1923 |
| 1,467,092 | Carroll | Sept. 4, 1923 |
| 1,467,094 | Carroll | Sept. 4, 1923 |
| 1,467,096 | Carroll | Sept. 4, 1923 |
| 2,093,464 | Malm | Sept. 21, 1937 |
| 2,160,458 | Gladding | May 30, 1939 |
| 2,362,166 | Sneicher | Nov. 7, 1944 |
| 2,535,290 | Ivett et al. | Dec. 26, 1950 |
| 2,558,047 | Gloor | June 26, 1951 |